(12) United States Patent
Fischer et al.

(10) Patent No.: US 11,938,885 B2
(45) Date of Patent: Mar. 26, 2024

(54) CURTAIN AIRBAG FOR FAR-SIDE IMPACTS

(71) Applicant: ZF Passive Safety Systems US Inc., Washington, MI (US)

(72) Inventors: Kurt Fischer, Rochester, MI (US); Alexandra Smith, Richmond, MI (US); Angelo Adler, Shelby Township, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/487,282

(22) Filed: Sep. 28, 2021

(65) Prior Publication Data
US 2023/0097595 A1 Mar. 30, 2023

(51) Int. Cl.
B60R 21/232 (2011.01)
B60R 21/213 (2011.01)
B60R 21/214 (2011.01)
B60R 21/231 (2011.01)
B60R 21/2338 (2011.01)

(52) U.S. Cl.
CPC .......... *B60R 21/232* (2013.01); *B60R 21/213* (2013.01); *B60R 21/214* (2013.01); *B60R 21/2338* (2013.01); *B60R 2021/23161* (2013.01); *B60R 2021/23386* (2013.01)

(58) Field of Classification Search
CPC .. B60R 2021/0048; B60R 2021/23161; B60R 2021/23308; B60R 2021/23316; B60R 2021/23386; B60R 21/213; B60R 21/214; B60R 21/232; B60R 21/233; B60R 21/2338
See application file for complete search history.

(56) References Cited

U.S. PATENT DOCUMENTS

| 5,730,464 A * | 3/1998 | Hill ................. B60R 21/23138 280/730.2 |
| 6,283,500 B1 * | 9/2001 | Eckert ................. B60R 21/232 280/743.1 |
| 7,222,877 B2 * | 5/2007 | Wipasuramonton ......... B60R 21/2338 280/730.2 |
| 8,210,566 B2 * | 7/2012 | Fukawatase .......... B60R 21/231 280/730.2 |
| 8,282,126 B2 * | 10/2012 | Wiik ................... B60R 21/233 280/730.2 |
| 8,360,469 B2 | 1/2013 | Wiik et al. |

(Continued)

FOREIGN PATENT DOCUMENTS

| CN | 106184103 A | 12/2016 |
| DE | 10038087 A1 | 8/2000 |

(Continued)

*Primary Examiner* — Laura Freedman
(74) *Attorney, Agent, or Firm* — TAROLLI, SUNDHEIM, COVELL & TUMMINO L.L.P.

(57) ABSTRACT

An apparatus for helping to protect an occupant of a vehicle in the event of a far-side collision in which the vehicle is impacted on a side opposite the seat in which the occupant is seated includes a curtain airbag configured to inflate and deploy from a roof of the vehicle in response to a far-side collision. The curtain airbag has an inflated and deployed condition in which the curtain airbag is positioned inboard of the vehicle occupant.

14 Claims, 7 Drawing Sheets

(56) References Cited

U.S. PATENT DOCUMENTS

| | | | | |
|---|---|---|---|---|
| 8,414,018 | B2* | 4/2013 | Choi | B60R 21/23138 |
| | | | | 280/729 |
| 8,480,123 | B2* | 7/2013 | Choi | B60R 21/231 |
| | | | | 280/730.2 |
| 8,684,408 | B2* | 4/2014 | Thomas | B60R 21/2338 |
| | | | | 280/730.2 |
| 8,702,122 | B2* | 4/2014 | Tomitaka | B60R 21/23138 |
| | | | | 280/730.2 |
| 9,004,526 | B2 | 4/2015 | Fukawatase et al. | |
| 9,016,718 | B2 | 4/2015 | Fukawatase et al. | |
| 9,493,135 | B2* | 11/2016 | Fukawatase | B60R 21/231 |
| 10,023,147 | B2* | 7/2018 | Kwon | B60R 21/23138 |
| 10,266,145 | B2* | 4/2019 | Paxton | B60R 21/232 |
| 10,351,092 | B2 | 7/2019 | Taguchi et al. | |
| 10,583,799 | B2* | 3/2020 | Schneider | B60R 21/214 |
| 10,589,708 | B2* | 3/2020 | Cho | B60R 21/0136 |
| 10,773,678 | B2 | 9/2020 | Markusic | |
| 10,864,881 | B2* | 12/2020 | Park | B60R 21/23138 |
| 10,926,735 | B2* | 2/2021 | Deng | B60R 21/231 |
| 11,383,669 | B2* | 7/2022 | Schneider | B60R 21/2338 |
| 11,440,499 | B2* | 9/2022 | Shibahara | B60R 21/23138 |
| 2017/0158160 | A1* | 6/2017 | Sugimori | B60R 21/207 |
| 2021/0170978 | A1* | 6/2021 | Acker | B60R 21/23138 |
| 2021/0197749 | A1* | 7/2021 | Wiik | B60R 21/207 |
| 2021/0268987 | A1* | 9/2021 | Choi | B60R 21/233 |
| 2022/0212625 | A1* | 7/2022 | Santín Navarro | B60R 21/232 |

FOREIGN PATENT DOCUMENTS

| | | | |
|---|---|---|---|
| GB | 2362139 | A | 11/2001 |
| JP | 2016107664 | A | 6/2016 |
| WO | 2020/229518 | A1 | 11/2020 |

* cited by examiner

CURTAIN AIRBAG FOR FAR-SIDE IMPACTS

TECHNICAL FIELD

This disclosure to an inflatable apparatus for helping to protect a vehicle occupant in the event of a side impact to the vehicle and/or a vehicle rollover. More specifically, this disclosure relates to a center-mounted curtain airbag for helping to protect occupants in the event of a far-side vehicle crash.

BACKGROUND

It is known to inflate an inflatable vehicle occupant protection device to help protect a vehicle occupant. One particular type of inflatable vehicle occupant protection device is a curtain airbag. The curtain airbag is inflatable away from the roof of the vehicle between a vehicle occupant and the side structure of the vehicle in response to a side impact to the vehicle and/or a vehicle rollover. A known curtain airbag is inflated from a deflated condition with inflation fluid directed from an inflator to the curtain airbag.

Curtain airbags are instrumental in affording protection to vehicle occupants in the event of an impact to the vehicle on the side adjacent to which they are seated. In this instance, the curtain airbag inflates between the occupant and the side structure where the impact occurred. When the vehicle undergoes a side impact, occupants of the seats opposite the impact are hurled or otherwise moved toward the impacted side of the vehicle, e.g., toward a center console of the vehicle.

SUMMARY

A curtain airbag is mounted in the vehicle roof inboard of the seated occupant(s) in the area of a vehicle longitudinal centerline. The curtain airbag is deployable in response to a side impact in order to help protect occupants of a vehicle seat on the side of the vehicle opposite the impact. The curtain airbag helps protect the so called "far-side" occupant from injuries sustained as a result of lateral vehicle accelerations caused by the side impact, and the resulting bending and other movements in the inboard direction that are experienced by the occupant.

According to one aspect, an apparatus for helping to protect an occupant of a vehicle in the event of a far-side collision in which the vehicle is impacted on a side opposite the seat in which the occupant is seated includes a curtain airbag configured to inflate and deploy from a roof of the vehicle in response to a far-side collision. The curtain airbag has an inflated and deployed condition in which the curtain airbag is positioned inboard of the vehicle occupant.

According to another aspect, the apparatus can include at least one tether having a first end configured to be connected to the vehicle at a location outboard of the curtain airbag and a second end connected to the curtain airbag.

According to another aspect, the first end of the at least one tether can be configured to be connected to the vehicle roof.

According to another aspect, the first end of the at least one tether can be configured to be connected to the vehicle roof at a location adjacent a side structure of the vehicle.

According to another aspect, the first end of the at least one tether can be configured to be connected to a roof rail of the vehicle.

According to another aspect, the first end of the at least one tether can be configured to be connected to a side structure of the vehicle.

According to another aspect, the first end of the at least one tether can be configured to be connected to a vehicle pillar.

According to another aspect, the at least one tether can include a first tether positioned forward of the vehicle occupant, and a second tether positioned rearward of the vehicle occupant.

According to another aspect, the first and second tethers can extend generally parallel to each other.

According to another aspect, the first and second tethers can extend generally inward at an angle from their connections to the vehicle to their connections to the curtain airbag.

According to another aspect, the curtain airbag can include a torso receiving portion configured to receive and cushion the occupant's torso moving inboard in response to the far side collision, and a head receiving portion configured to receive and cushion the occupant's head moving inboard in response to the far side collision. The head receiving portion can be configured to help reduce movement of the occupant's head relative to the occupant's torso in order to help limit neck bending and reduce neck loading.

According to another aspect, the thickness of the head receiving portion can be increased over the thickness of the torso receiving portion so as to decrease the distance between the occupant's head and the head receiving portion of the curtain airbag.

According to another aspect, the thickness of the head receiving portion can be configured so that, when the curtain airbag is inflated and deployed, the distance between the head receiving portion and the occupant's head is about the same as the distance between the torso receiving portion and the occupant's torso.

According to another aspect, the curtain airbag can include a generally inverted U-shaped main chamber that defines the torso receiving portion of the curtain airbag. The head receiving portion can be positioned with an opening defined by the U-shape of the main chamber. The head receiving portion can be configured to deflect relative to the main chamber.

According to another aspect, the apparatus can also include a tether that connects the head receiving portion to the torso receiving portion. The tether can be configured to become tensioned when the curtain airbag is inflated and deployed so that the head receiving portion is deflected toward the occupant.

According to another aspect, the tether can be configured so that the distance that the head receiving portion is deflected positions the head receiving portion so that, when the curtain airbag is inflated and deployed, the distance between the head receiving portion and the occupant's head is about the same as the distance between the torso receiving portion and the occupant's torso.

According to another aspect, the head receiving portion can include an opening configured to receive at least a portion of the occupant's head when the occupant moves into engagement with the curtain airbag.

According to another aspect, the torso receiving portion can include a plurality of vertically extending parallel chambers.

According to another aspect, the opening can be defined by a connection of overlying panels of the curtain airbag that extends the perimeter of the opening. The vertically extending parallel chambers can be defined by vertically extending connections of the overlying panels of the curtain airbag.

The at least one of the vertically extending connections can intersect the connection that defines the opening so that the vertically extending chambers configured to receive the torso extend up to and terminate at the head receiving opening.

According to another aspect, the curtain airbag is configured to be positioned centrally in the vehicle when inflated and deployed.

According to another aspect, the apparatus can also include at least one tether configured to connect the curtain airbag to the vehicle on a first outboard side of the vehicle, and at least one second tether configured to connect the curtain airbag to the vehicle on a second outboard side of the vehicle, opposite the first outboard side of the vehicle, the curtain airbag being configured to help protect occupants seated on opposite sides of the curtain airbag.

According to another aspect, the curtain airbag can include a head receiving portion positioned above a torso receiving portion. The head receiving portion can have a thickness that is increased over the thickness of the torso receiving portion so as to decrease the distance between heads of occupants seated on opposite sides of the curtain airbag and the head receiving portion of the curtain airbag.

According to another aspect, the thickness of the head receiving portion can be configured so that, when the curtain airbag is inflated and deployed, the distances between the head receiving portion and the occupants' heads is about the same as the distance between the torso receiving portion and the occupants' torsos.

According to another aspect, the curtain airbag can include a generally inverted U-shaped main chamber defining a torso receiving portion of the curtain airbag, and a head receiving portion positioned with an opening defined by the U-shape of the main chamber. The head receiving portion can be configured to deflect relative to the main chamber.

According to another aspect, an airbag module can include the curtain airbag and an inflator configured to provide inflation fluid for inflating the curtain airbag.

According to another aspect, a vehicle safety system can include the airbag module, at least one crash sensor, and an airbag control unit configured to detect a far-side collision in response to signals received from the at least one crash sensor. The airbag control unit can be configured to actuate the inflator in response to detecting the far-side collision.

DRAWINGS

The foregoing and other features of the present disclosure will become apparent to one skilled in the art to which the present disclosure relates upon consideration of the following description with reference to the accompanying drawings, in which.

DETAILED DESCRIPTION

Figure 1:
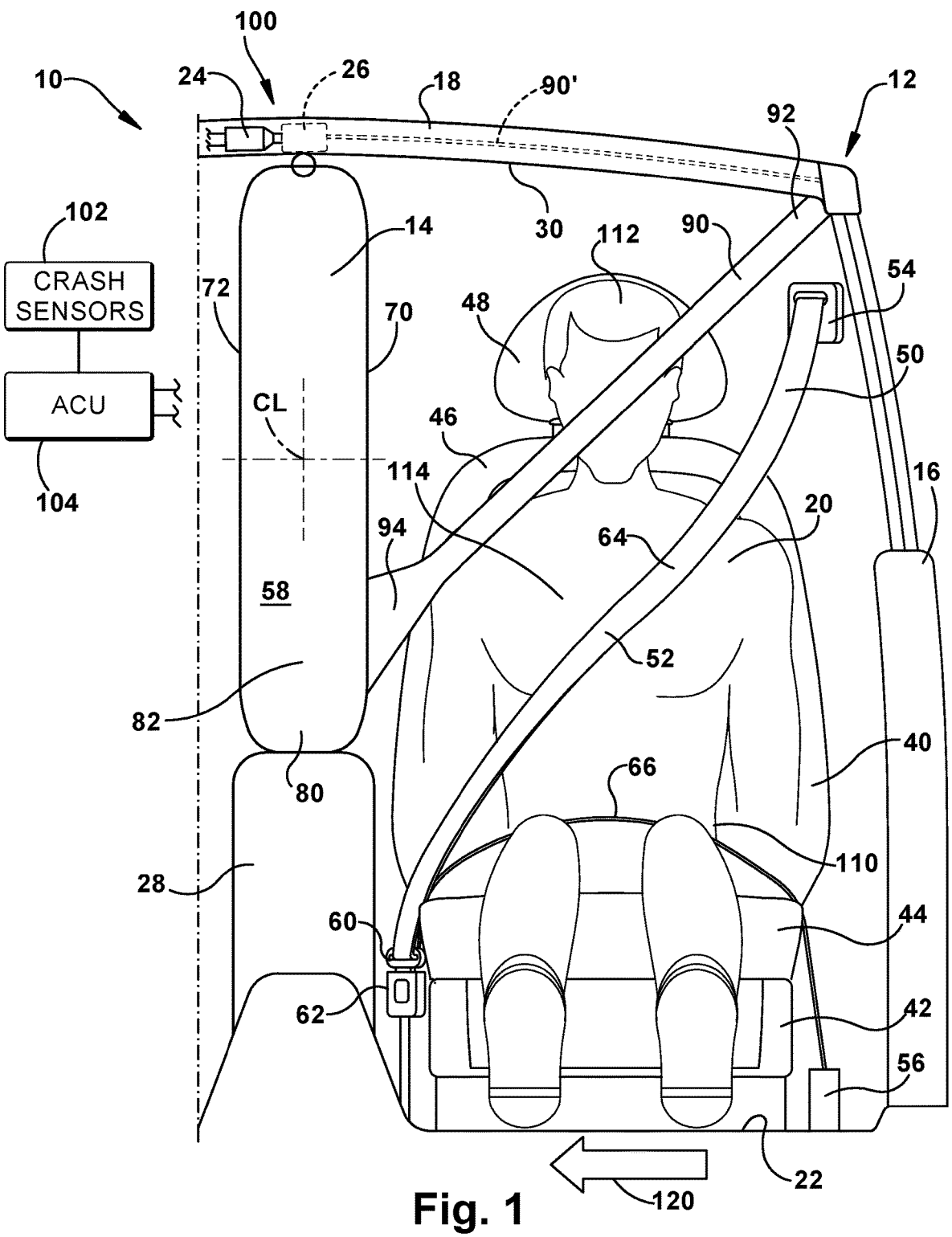
FIG. 1 is a schematic front view illustrating an example configuration of an apparatus for helping to protect a vehicle occupant.
Figure 2:
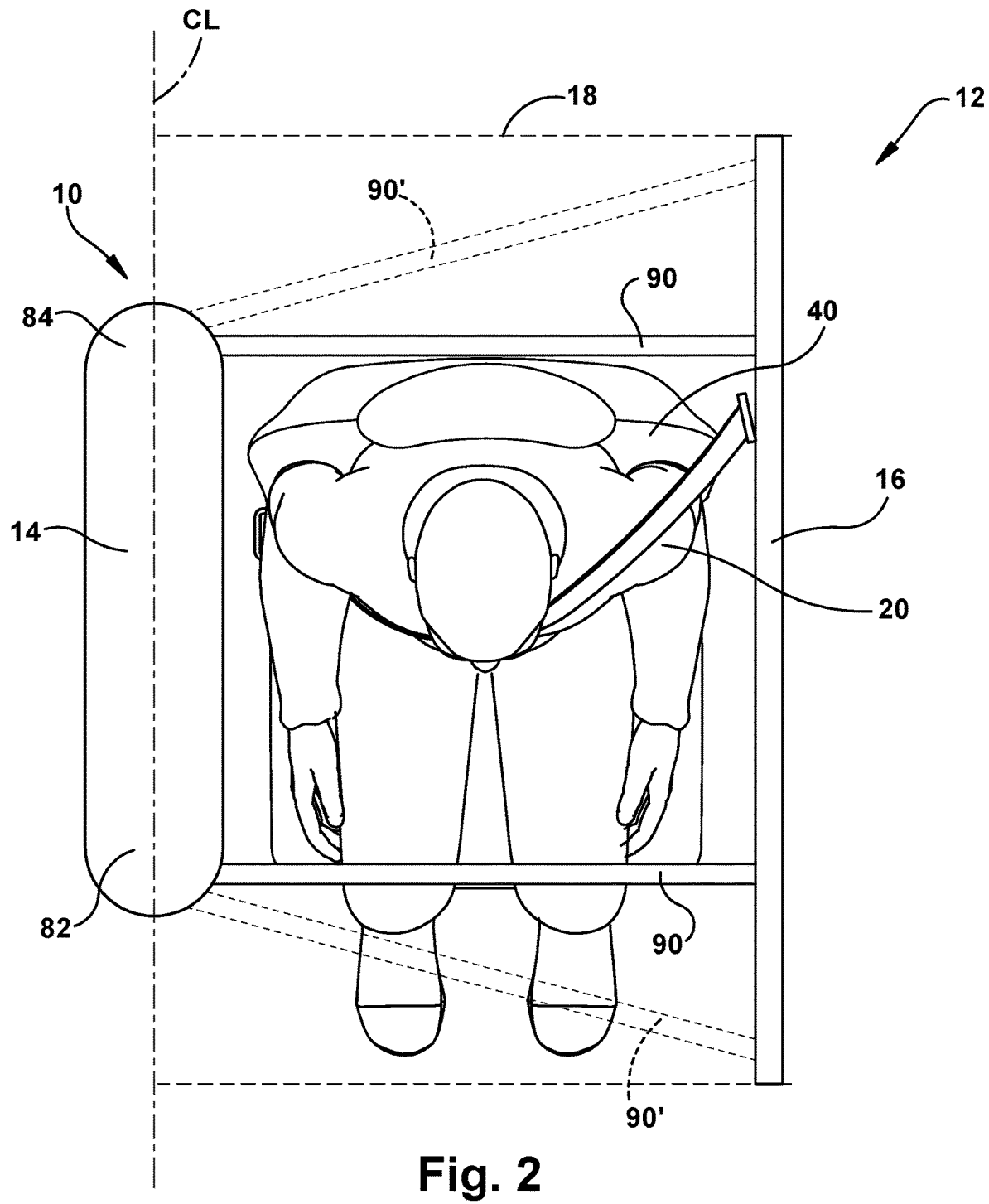
FIG. 2 is a schematic top view of the apparatus according to the example configuration of FIG. 1.

An example configuration of a safety system 10 for helping to protect an occupant 20 of a vehicle 12 is shown in FIGS. 1 and 2. The safety system 10 includes an inflatable vehicle occupant protection device in the form of a curtain airbag 14. The curtain airbag 14 is mounted to the vehicle roof 18 centrally in the vehicle 12, which places the occupant 20 between the curtain airbag and the side structure 16 of the vehicle. The curtain airbag 14 extends fore and aft in the vehicle 12, generally parallel to a longitudinal centerline CL of the vehicle. The curtain airbag 14 can be positioned on the centerline CL or can be offset from the centerline depending on factors, such as the vehicle architecture and the intended occupant(s) that the airbag is configured to protect.

The occupant 20 is supported in a seated position on vehicle seat 40. The vehicle seat 40 includes a base 42 connected to the vehicle 12, e.g., to the floor 22. The seat base 42 supports a seat bottom cushion 44. A seatback 46 extends upward from the seat bottom 44 and has a reclined position that can be adjusted. A headrest 48 is positioned at an upper end of the seatback 46.

The safety system 10 also includes an occupant restraint in the form of a seatbelt 50. As shown in the example configuration of FIG. 1, the seatbelt 50 can have a three-point configuration. In this configuration, a single length of seatbelt webbing 52 has a first end connected to a retractor 54, which is mounted to the vehicle 12 on a first lateral side of the seat 40. The retractor 54 can, for example, be mounted to the side structure 16 (e.g., a side pillar), to the floor 22, or to the seat 40 (e.g., to the seatback 46).

From the retractor 54, the seatbelt webbing 52 extends through a tongue 60, which is connectable to a buckle 62 to secure the seatbelt 50 around the occupant 20. A second end of the seatbelt webbing 52 is secured to an anchor 56. When the seatbelt 50 is drawn across the occupant 20 and the tongue 60 is latched in the buckle 62, the seatbelt includes a shoulder portion 64 that extends across the shoulder and torso of the occupant 20, and a lap portion 66 that extends across the occupant's lap.

The safety system 10 also includes an inflator 24 connected in fluid communication with the curtain airbag 14. The inflator 24 contains a stored quantity of pressurized inflation fluid in the form of a gas for inflating the curtain airbag 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 24 could be of any suitable type or construction for supplying a medium for inflating the curtain airbag 14.

A cover 26, such as a fabric sheath, can package and help support the curtain airbag 14 in a stored and deflated condition. The packaged curtain airbag 14 and the cover 26 have an elongated configuration and extend along the centerline CL of the vehicle roof 18. The curtain airbag 14, packaged in the cover 26, along with the inflator 24, can form an airbag module 100 that can be installed in the vehicle 12 as a unit. When installed, the airbag module 100 can be connected to the sheet metal structure of the vehicle roof 18, for example, by screws or other threaded fasteners, and stored behind a vehicle roof liner or headliner 30.

The curtain airbag 14 includes panels 70 and 72 of material that are arranged in an overlying manner. Overlapping portions of the panels 70 and 72 are interconnected along at least a portion of a perimeter of the curtain airbag 14 to help define an inflatable volume 58 of the curtain airbag 14. The curtain airbag 14 can also include interior connections (not shown) in which the overlying panels 70 and 72 are interconnected within the perimeter of the curtain to form non-inflatable portions that help define inflatable chambers of the curtain.

The curtain airbag 14 can be formed in a variety of manners. For example, the curtain airbag 14 can have a one piece woven (OPW) construction in which yarns (e.g., nylon yarns) are woven simultaneously to form both the one-layer portions where the panels 70, 72 are interconnected, and two-layer portions where the panels are separate. As another example, the curtain airbag 14 can be formed from separately woven panels that are interconnected, for example, by stitching, ultrasonic welding, heat bonding, or adhesives.

Regardless of the construction, the curtain airbag 14 can be coated with a gas impermeable material, such as urethane, or laminated with a gas impermeable film. The curtain airbag 14 thus can have a substantially gas-tight construction. Those skilled in the art will appreciate that alternative materials, such as polyester yarn, and alternatives coatings, such as silicone, can also be used to construct the curtain airbag 14.

As shown in FIGS. 1 and 2, one or more tethers 90 can connect the curtain airbag 14 to the vehicle 12. In the example configuration of FIGS. 1 and 2, there are two such tethers 90—one that connects a front portion 82 of the curtain airbag 14 to the vehicle 12, and one that connects a rear portion 84 of the curtain airbag to the vehicle. The tethers 90 can also be included in the airbag module 100, and can therefore be installed in the vehicle as a unit with the packaged curtain airbag 14 and inflator 24.

Each tether 90 has a first end 92 connected to the vehicle 12 and an opposite second end 94 connected to the curtain airbag 14. More specifically, referring to FIG. 1, the first ends 92 of the tethers 90 can be connected to the vehicle 12 at or near an outboard edge of the vehicle roof 18, where the roof meets the side structure 16. The second ends 94 of the tethers 90 can be connected to the curtain airbag 14 at or near a lower edge 80 of the airbag at front and rear portions 82 and 84, respectively.

The locations where the tethers 90 are connected to the curtain airbag 14 and to the vehicle 12 can vary. For example, while the second end 94 of the tether 90 is shown as being connected at a lower edge 80 of the curtain airbag 14, it could be connected at a location spaced (i.e., higher up) on the airbag. As another example, while the first end 92 of the tether 90 is shown as being connected at the outboard edge of the roof 18, it could be connected at a location spaced inboard of the side structure 16. Additionally, as shown in FIG. 2, the connection of the first ends 92 of the tethers 90 to the roof 18 could be such that they extend generally parallel to each other and perpendicular to the vehicle centerline CL. Alternatively, the connections of one or both of the tethers could be moved fore or aft in the vehicle, as shown in dashed lines at 90' in FIG. 2.

The safety system 10 includes one or more sensors 102 for sensing the occurrence of an event for which deployment of the curtain airbag 14 is desired. Upon detecting the occurrence such an event, the sensors 102 send a signal to an airbag controller 104, which actuates the inflator 24 to provide inflation fluid to the inflatable volume of the curtain airbag 14 to inflate and deploy the curtain airbag from the stored condition to the deployed condition. Tear seams in the headliner 30 allow the curtain airbag 14 and tethers 90 to deploy from their stored conditions. The curtain airbag 14 deploys in a generally downward direction, away from the roof 18, and becomes positioned on an inboard side of the occupant 20. In doing so, the tethers 90 become tensioned by the inflated airbag 14.

The curtain airbag 14 is configured and arranged to help protect the occupant 20 in the event of what is referred to herein as a "far-side" collision. A far-side collision is a side impact to the vehicle 12 on a side opposite the seated position of the occupant 20. For a driver side occupant, the far-side collision involves an impact on the passenger side of the vehicle 12. For a passenger side occupant, the far-side collision involves an impact on the driver side of the vehicle 12.

When a far-side collision occurs, the vehicle 12 is accelerated laterally in the direction of the impact, i.e., in the direction of the impacting vehicle or other impacting structure. In response, the occupant 20 moves at the hips 110 in the impact direction, indicated generally by the arrow labeled 120 in FIG. 1, with the vehicle 12, because the hips are secured in the seat 40 by the seatbelt 50, and also due to engagement of the hips with adjacent structure, such as a center console 28, of the vehicle 12. The occupant's head 112 and torso 114, however, are not restrained significantly the seat (e.g., by the seatbelt 50), nor are they moved by any central vehicle structure. As a result, the head 112 and torso 114 can undergo lateral bending along the spine, i.e., along the back and neck.

The vehicle safety system 10 is configured to help protect the occupant 20 from injuries that can result from far-side collisions. The curtain airbag 14 is configured and positioned to receive the occupant 20 and to cushion and slow his/her lateral movement resulting from the far-side collision. The curtain airbag 14 is configured to be positioned laterally inboard of the occupant 20 and to cover, at least partially, the occupant's head 112 and torso 114. The curtain airbag 14 is therefore positioned to receive the occupant's head 112 and torso 114 in response to a far-side collision.

The tethers 90, being connected to the roof 18 and/or side structure 16 at an outboard location, become tensioned in response to the occupant 20 impacting and exerting a force on the curtain airbag 14 in a direction opposite the impact direction 120 in response to the far-side collision. As a result, the curtain airbag 14 uses the roof 18 and/or side structure 16 as a reaction surface or structure for supporting the curtain airbag 14 against the impacting occupant 20. The vehicle safety system 10 is thereby configured so that the curtain airbag 14 can receive the impacting occupant 20, distribute the impact force of the occupant over a large area of the curtain, which cushions the occupant and provides the desired ride-down effect.

By "ride-down" effect, it is meant that the curtain airbag 14 gradually slows or decelerates the moving occupant 20 in a cushioning manner that avoids, to the extent possible, an abrupt or rapid deceleration or, even more so, an impact. A good ride-down effect is desirable for both the head and torso 114 of the occupant 20. Good ride-down is especially desirable with the occupant's head 112, due to the heightened concern over brain injuries. Providing a desirable ride-down effect aids significantly in avoiding brain injuries associated with rapid head deceleration.

At the same time, providing an effective ride-down in terms of providing a desired head deceleration needs to be balanced with providing adequate neck protection. Neck injuries can occur through bending as the occupant's head 112 moves relative to his/her torso 114. This bending can occur as the occupant 20 impacts the curtain airbag 14 and there is a differential in the timing and/or rates of deceleration of the head 112 and torso 114. This also can occur as a result of rebound, wherein the occupant's head 112 rebounds in a direction opposite the impact direction after having been cushioned by the curtain airbag 14. Rebounding therefore results in neck bending in a direction opposite the impact direction, which can compound the situation.

For the example configuration of the curtain airbag 14 illustrated in FIGS. 1 and 2, since the curtain airbag has a generally flat chambered curtain design, the balance between ride-down and rebound can be effectuated through chamber design, bag pressurization, and the configuration of the tethers 90. For example, the chambers can be configured to produce a pressure differential between chambers that receive the head and torso. As another example, the overall pressurization of the curtain airbag 14 can be selected to find a balance between cushioning (ride-down) and rebound. Finally, the tethers 90 can be configured, e.g., via their lengths and/or connection location on the curtain airbag 14, so that the limits of airbag movement/travel in response to the impacting occupant occur at a desired location. All of these variables can be determined through crash testing or computer modeling in order to accommodate various sized statistical occupants, such as the 50% male, the 95% male, the 5% female, or a combination thereof.

Figure 3:
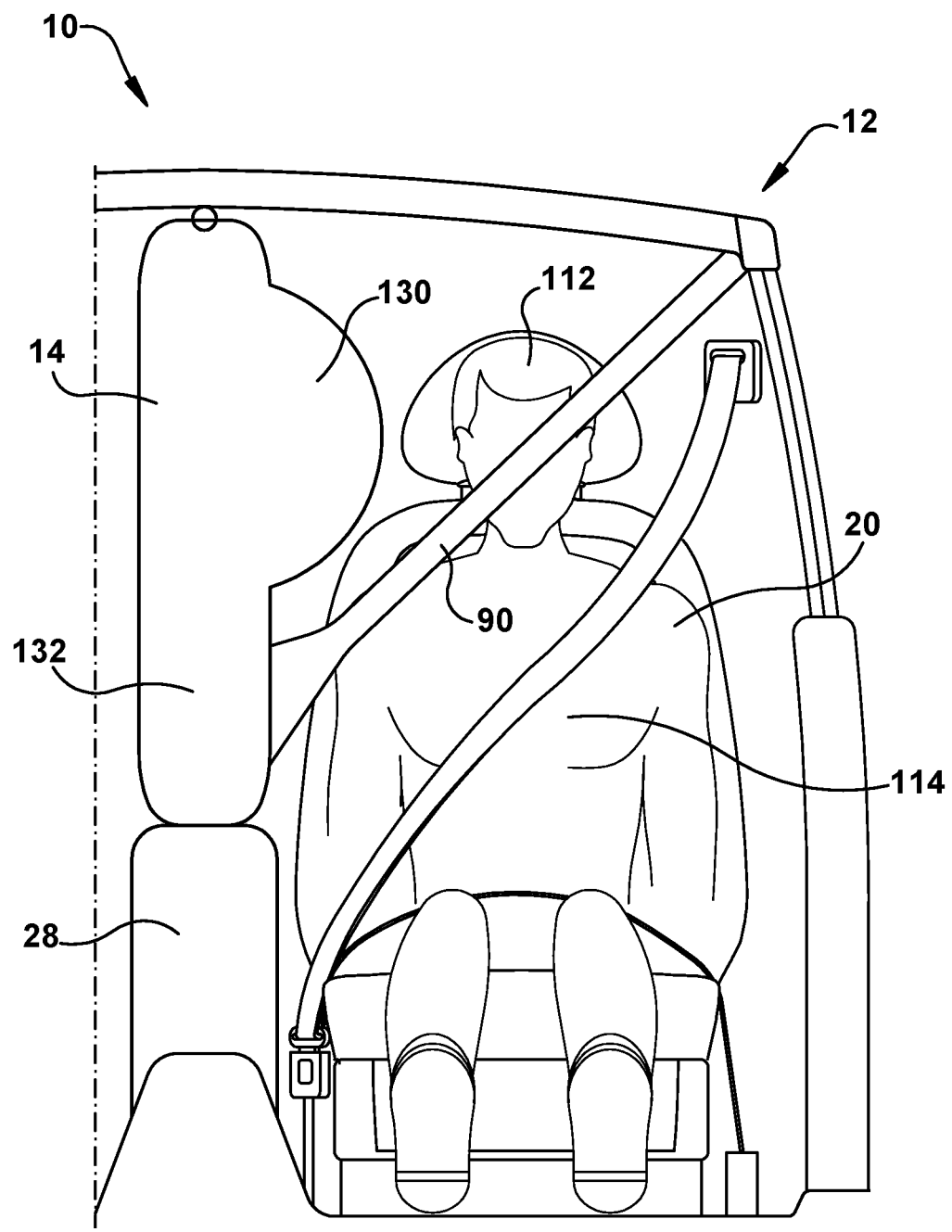
FIG. 3 is a schematic view illustrating a second example configuration of an apparatus for helping to protect a vehicle occupant.

The configuration of the curtain airbag 14 is not limited to that shown in FIGS. 1 and 2. An example configuration of the vehicle safety system 10 that implements an alternative configuration of the curtain airbag 14 is illustrated in FIG. 3. While the safety system 10 of FIG. 3 illustrates one particular configuration of the tether 90, it should be appreciated that the safety system of FIG. 3 can implement any of the configurational tether 90 variations described hereinabove with regard to FIGS. 1 and 2.

The curtain airbag 14 of FIG. 3 can be similar or identical to the configuration described hereinabove with regard to FIGS. 1 and 2, with the exception that it includes a head receiving portion 130 positioned above a torso receiving portion 132. The head receiving portion 130 is an area of the curtain airbag 14 having an increased thickness. The added thickness of the head receiving portion 130 extends toward the occupant's head 112, which decreases the distance between the occupant's head and the curtain airbag 14.

The thickness of the head receiving portion 130 can be configured so that the distance between the head receiving portion and the occupant's head 112 is commensurate with or about the same as the distance between the torso receiving portion 132 and the occupant's torso 114. Because of this, the occupant 20, moving into engagement with the curtain airbag 14 in response to a far-side collision, will impact the bag with his/her head 112 and torso 114 closer in time, e.g., simultaneously or at about the same time. As a result, the curtain airbag 14 can begin to cushion the occupant's head 112 and torso 114 at about the same time, as opposed to the torso being cushioned first, followed by the head.

Advantageously, this curtain airbag configuration can help prevent or cushion against neck bending and loading in response to the far-side collision. Impacting the curtain airbag 14 in response to an opposite side collision, the occupant's torso 114 and head 112 move inboard toward the airbag, which results in neck bending toward the airbag. The shape of the head receiving portion 130, being configured to engage the head 112 earlier in the event, helps prevent and/or reduce neck bending and the resulting neck loading produced by the impact. It will therefore be appreciated that, in the particular circumstance of cushioning inboard occupant movement in response to a far side collision, the head receiving portion 130 of the curtain airbag 14 reduces head movement relative to the torso, which reduces neck bending and loading.

For the curtain airbag 14 of FIG. 3, the balance between providing an effective ride-down and avoiding excessive rebound can be effectuated by tailoring the chamber design, bag pressurization, and the configuration of the tethers 90, as discussed above. Additionally, for the configuration of FIG. 3, the balance between ride-down and rebound can be effectuated through the respective configurations of the head receiving portion 130 and the torso receiving portion 132. Positioning the curtain airbag 14 equidistant from the occupant's head 112 and torso 114, the configurations of these portions can also help account for any potential differential in head and torso accelerations, which can help reduce neck bending in the impact direction. Because of this, the tailoring of the chamber design, bag pressurization, and the configuration of the tethers 90 can be tailored to help limit rebound. Again, all of these variables can be determined, for example, through crash testing or computer modeling of the particular curtain airbag configuration of FIG. 3, in order to accommodate various sized statistical occupants, such as the 50% male, the 95% male, the 5% female, or a combination thereof.

Figure 4A:
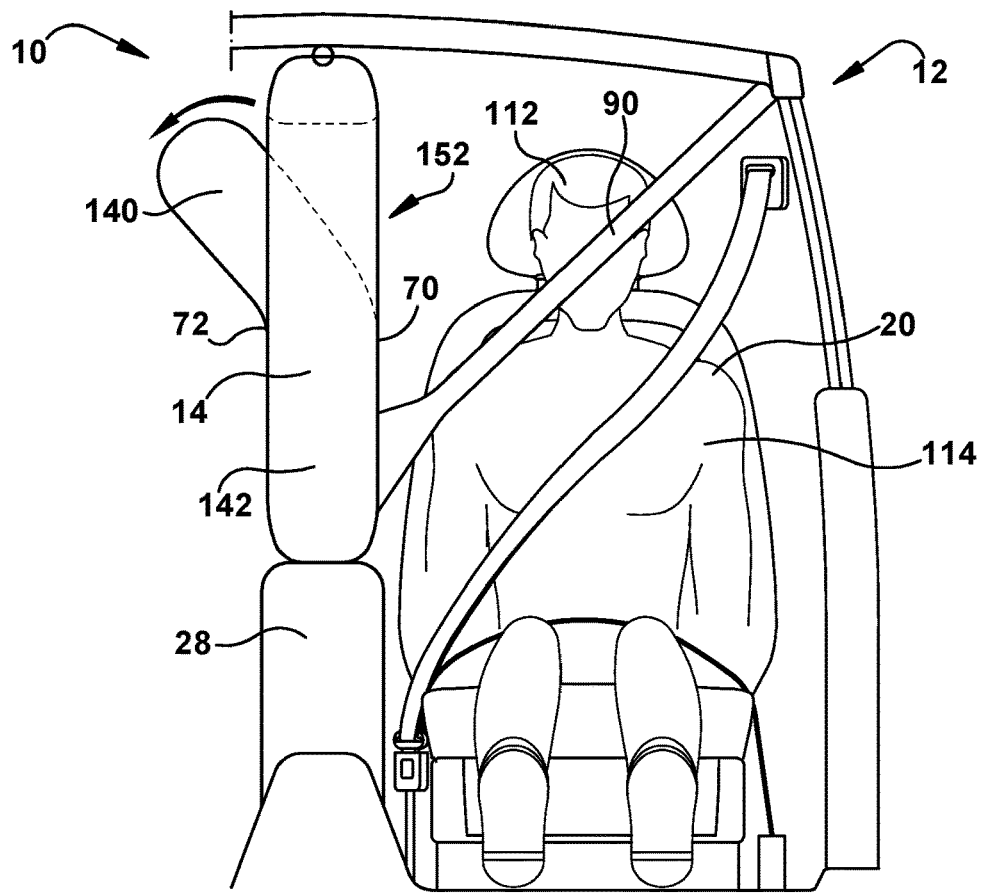
FIGS. 4A and 4B are schematic views illustrating a third example configuration of an apparatus for helping to protect a vehicle occupant.
Figure 4B:
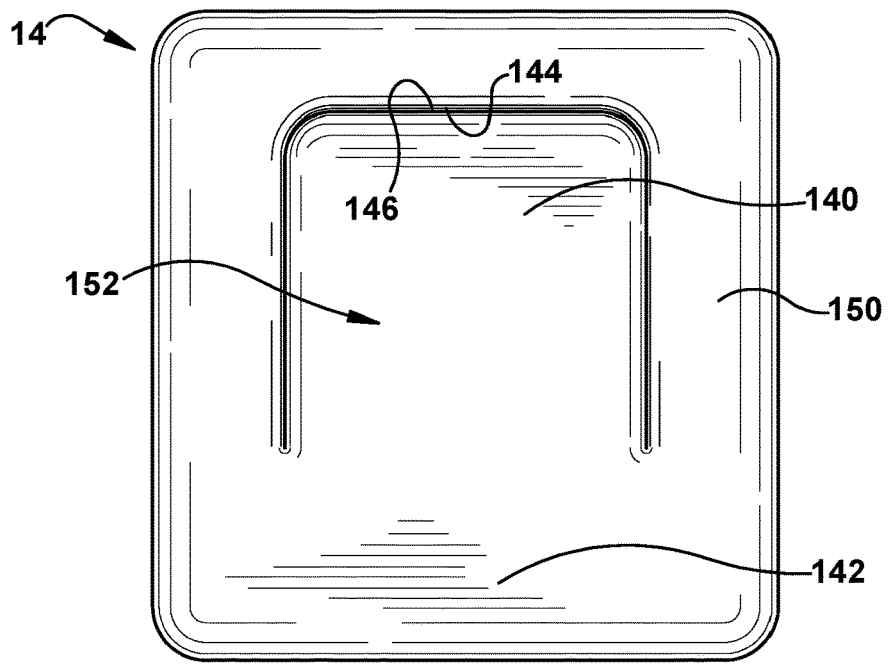

Another example configuration of the vehicle safety system 10 that implements an alternative configuration of the curtain airbag 14 is illustrated in FIGS. 4A and 4B. While the safety system 10 of FIGS. 4A and 4B illustrate one particular configuration of the tether 90, it should be appreciated that the safety system of FIGS. 4A and 4B can implement any of the configurational tether 90 variations described hereinabove with regard to FIGS. 1 and 2.

The curtain airbag 14 of FIGS. 4A and 4B can be similar or identical to the configuration described hereinabove with regard to FIGS. 1 and 2, with the exception that it includes a head receiving portion 140 positioned above a torso receiving portion 142. The head receiving portion 140 is an area or chamber of the curtain airbag 14 defined respective connections 144, 146 between the airbag panels 70, 72 that extend in a generally inverted U-shaped configuration.

The connection 144 is a generally inverted U-shaped connection that helps define a main chamber 150 of the curtain airbag 14, which includes the torso portion 142. The connection 144 also defines an opening 152 that extends through the main chamber 150. The connection 146 defines the head receiving portion 140 and gives it a rectangular configuration. The head receiving portion 140 is positioned in the opening 152 in the main portion 150, and is configured and arranged to receive the occupant's head 112 when moving in response to a far-side collision. When the occupant's head 112 impacts the head receiving portion 140, it can be displaced by bending relative to the main portion 150, allowing the occupant's head to move into the opening 152 while being cushioned at the same time by the head receiving portion.

Advantageously, this curtain airbag configuration can help prevent or cushion against neck bending and loading in response to the far-side collision. Impacting the curtain airbag 14 in response to an opposite side collision, the occupant's torso 114 and head 112 move inboard toward the airbag, which results in neck bending toward the airbag. The head receiving portion 140, being configured to receive the occupant's head 112 and to become displaced in response thereto, allows for cushioning and slowing the head, which helps prevent and/or reduce neck bending and the resulting neck loading produced by the impact. It will therefore be appreciated that, in the particular circumstance of cushioning inboard occupant movement in response to a far side collision, the head receiving portion 140 of the curtain airbag 14 reduces head movement relative to the torso, which reduces neck bending and loading.

For the curtain airbag 14 of FIGS. 4A and 4B, the balance between providing an effective ride-down and avoiding excessive rebound can be effectuated by tailoring the design and pressurization of the main portion 150 and head receiving portion 140, and the configuration of the tethers 90, as discussed above. The deflection of the head receiving portion 140 relative to the torso portion 150, provides a cushioning function for effective ride-down. At the same time, the head receiving portion 140 can also help limit rebound due to its deflecting with the occupant's head 112, as opposed to simply being compressed by the occupant's head, as would be the case with an airbag configuration in which the head receiving portion does not deflect. The rebound force applied to the occupant's head 112 can be reduced with the airbag configuration of FIGS. 4A and 4B. Because of this, the tailoring of the chamber design, bag pressurization, and the configuration of the tethers 90 can be tailored to help limit rebound. Again, all of these variables can be determined, for example, through crash testing or computer modeling of the particular curtain airbag configuration of FIGS. 4A and 4B, in order to accommodate various sized statistical occupants, such as the 50% male, the 95% male, the 5% female, or a combination thereof.

Figure 5:
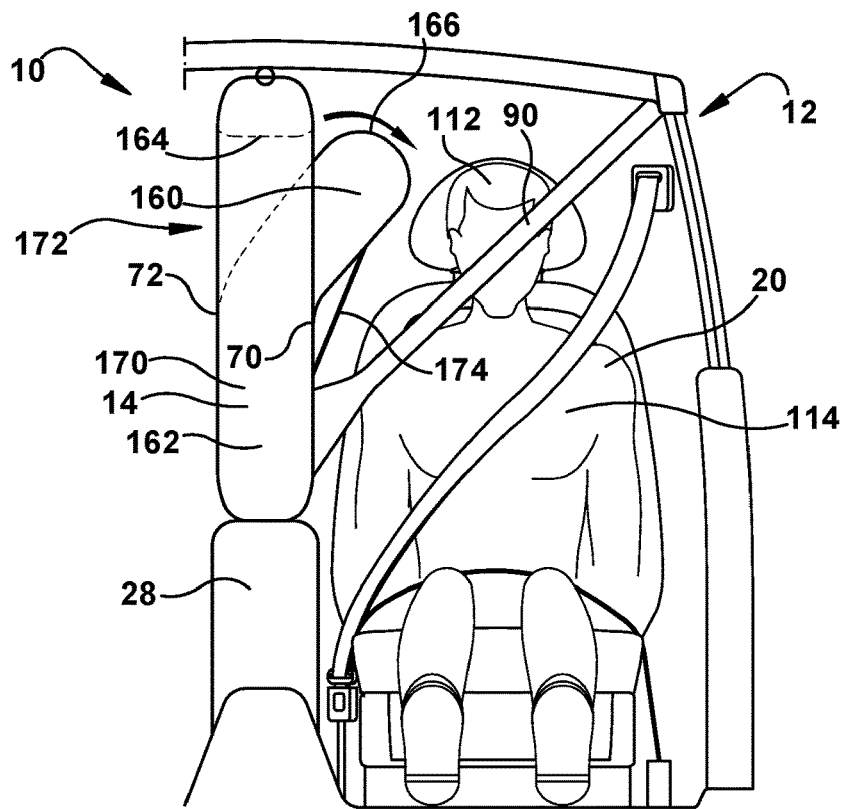
FIG. 5 is a schematic view illustrating a fourth example configuration of an apparatus for helping to protect a vehicle occupant.

Another example configuration of the vehicle safety system 10 that implements an alternative configuration of the curtain airbag 14 is illustrated in FIG. 5. While the safety system 10 of FIG. 5 illustrates one particular configuration of the tether 90, it should be appreciated that the safety system of FIG. 5 can implement any of the configurational tether 90 variations described hereinabove with regard to FIGS. 1 and 2.

The curtain airbag 14 of FIG. 5 is essentially a hybrid configuration that implements features of the configuration of FIG. 3 and the configuration of FIGS. 4A and 4B. As such, the curtain airbag 14 of FIG. 5 includes a head receiving portion 160 positioned above a torso receiving portion 162. The head receiving portion 160 is an area or chamber of the curtain airbag 14 defined respective connections 164, 166 between the airbag 70, 72 that extend in a generally inverted U-shaped configuration.

The connection 164 is a generally inverted U-shaped connection that helps define a main chamber 170 of the curtain airbag 14, which includes the torso portion 162. The connection 164 also defines an opening 172 that extends through the main chamber 170. The connection 166 defines the head receiving portion 160 and gives it a rectangular configuration. The curtain airbag 14 is configured so that the head receiving portion 160 can be received in the opening 172.

Implementing the principles of the example configuration of FIG. 3, the curtain airbag 14 of FIG. 5 includes a tether 174 that connects the head receiving portion 160 to the torso receiving portion 162. The length of the tether 174 is configured so that the head receiving portion 160 is deflected toward the occupant 20 (i.e., outboard) when the curtain airbag 14 is in the inflated and deployed condition. This decreases the distance between the occupant's head and the head receiving portion 160 of the curtain airbag 14.

The degree to which the tether 174 deflects the head receiving portion 160 can be configured so that the distance between the head receiving portion and the occupant's head 112 is commensurate with or about the same as the distance between the torso receiving portion 162 and the occupant's torso 114. Because of this, the occupant 20, moving into engagement with the curtain airbag 14 in response to a far-side collision, will impact the bag with his/her head 112 and torso 114 closer in time, e.g., simultaneously or at about the same time. As a result, the curtain airbag 14 can begin to cushion the occupant's head 112 and torso 114 at about the same time, as opposed to the torso being cushioned first, followed by the head. Advantageously, this can help prevent or cushion against neck bending and loading in response to the far-side collision.

In response to the impacting occupant 20, the head receiving portion 160 can deflect and move into the opening 172 in the main portion 170. When the occupant's head 112 impacts the head receiving portion 160, it can be displaced by bending relative to the main portion 170, moving into and through the opening 172 in response to being impacted by the occupant's head 112. The head receiving portion 160 can therefore cushion the occupant's head and provide the desired ride-down effect.

Advantageously, this curtain airbag configuration can help prevent or cushion against neck bending and loading in response to the far-side collision. Impacting the curtain airbag 14 in response to an opposite side collision, the occupant's torso 114 and head 112 move inboard toward the airbag, which results in neck bending toward the airbag. The head receiving portion 160, being configured to receive the occupant's head 112 earlier in the event due to the inclusion of the tether 174 and to become displaced in response thereto and enter the opening 172, allows for cushioning and slowing the head early on in the event, which helps prevent and/or reduce neck bending and the resulting neck loading produced by the impact. It will therefore be appreciated that, in the particular circumstance of cushioning inboard occupant movement in response to a far side collision, the head receiving portion 160 of the curtain airbag 14 reduces head movement relative to the torso, which reduces neck bending and loading.

For the curtain airbag 14 of FIG. 5, the balance between providing an effective ride-down and avoiding excessive rebound can be effectuated by tailoring the design and pressurization of the main portion 150 and head receiving portion 140, and the configuration of the tethers 90, as discussed above. Because the curtain airbag 14 of FIG. 5 combines elements of the airbag of FIGS. 3, 4A, and 4B, the manner in which this balance is achieved can take into account considerations similar to those described above in regard to those configurations. The deflection of the head receiving portion 160 relative to the main portion 170, provides a cushioning function for effective ride-down.

Additionally, the tether 174 maintaining the head receiving portion 160 at the same distance from the occupant's head 112 as the main portion 170 is from the occupant's torso 114 also helps reduce neck bending. At the same time, the head receiving portion 160 can also help limit rebound due to its deflecting with the occupant's head 112, as opposed to simply being compressed by the occupant's head, as would be the case with an airbag configuration in which the head receiving portion does not deflect. The rebound force applied to the occupant's head 112 can also be reduced with the airbag configuration of FIG. 5. Because of this, the tailoring of the chamber design, bag pressurization, and the configuration of the tethers 90 can be tailored to help limit rebound. Again, all of these variables can be determined, for example, through crash testing or computer modeling of the particular curtain airbag configuration of FIG. 5, in order to accommodate various sized statistical occupants, such as the 50% male, the 95% male, the 5% female, or a combination thereof.

Figure 6:
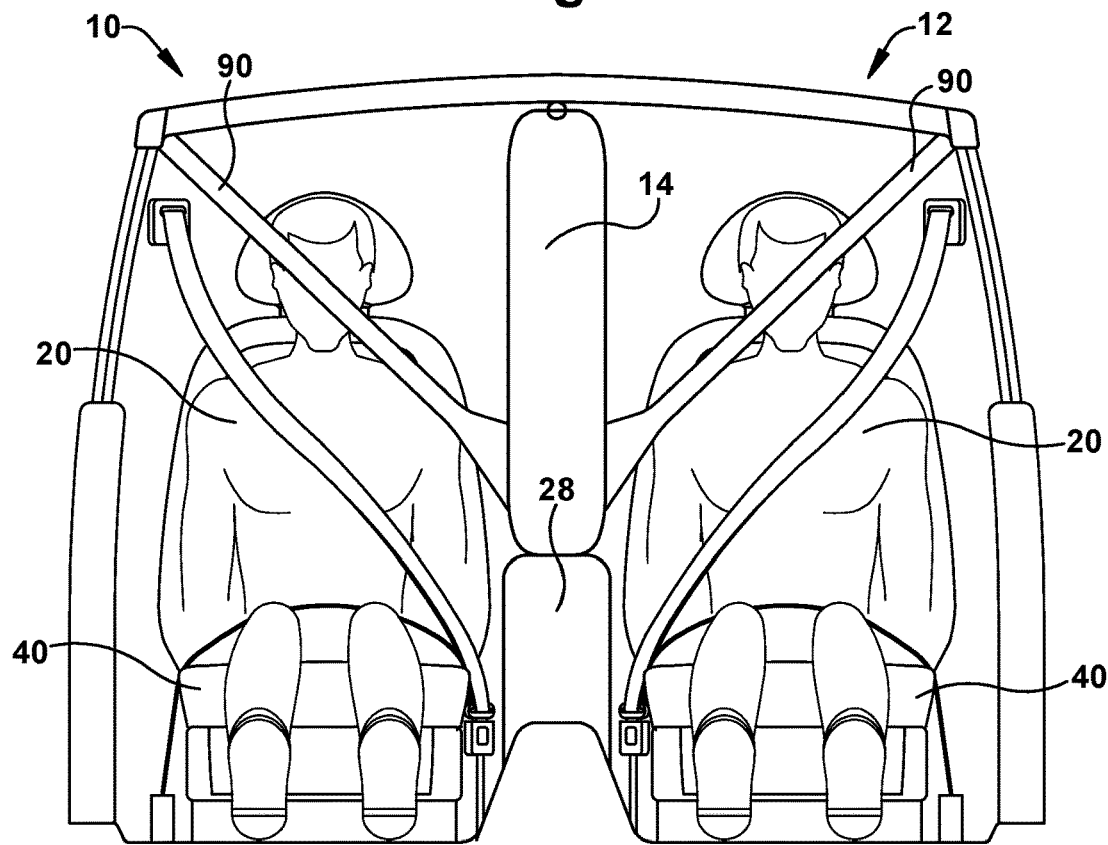
FIG. 6 is a schematic view illustrating a fifth example configuration of an apparatus for helping to protect a vehicle occupant.

Heretofore, the vehicle safety system 10 has been described as implementing a curtain airbag 14 configured to protect a single occupant 20 of a single seat 40 in the vehicle 12. The vehicle safety system 10, however, is not limited to such a configuration. Referring to FIG. 6, the vehicle safety system 10 can implement an airbag 14 configured to help protect occupants 20 of seats 40 positioned adjacent each other, such as driver side and passenger side occupants. The seats 40 can be separated by vehicle structure, such as a center console 28, but this is a necessary requirement.

As shown in FIG. 6, the airbag 14 can be similar or identical to the airbag of FIGS. 1 and 2 and can therefore implement any of the features described above in regard to those configurations, such as alternative tether 90 configurations. The vehicle safety system of FIG. 6, however, includes tethers 90 that connect the curtain airbag 14 to both sides of the vehicle 12, again according to any of the alternative tether configurations described above.

Advantageously, the vehicle safety system 10 of FIG. 6 can help protect both occupants in the event of a far-side collision. In the event of a collision on the driver side of the vehicle, curtain airbag 14 helps protect the occupant 20 seated on the passenger side of the vehicle 12. In the event of a collision on the passenger side of the vehicle, curtain airbag 14 helps protect the occupant 20 seated on the driver side of the vehicle 12. The configuration of the tethers 90 facilitates this dual function, providing a reaction surface or structure for the curtain airbag 14 regardless of which side the collision takes place and, therefore, regardless of which occupant experiences the effects of a far-side collision.

The far-side collision involves only one of the occupants 20—the one seated on the side opposite the side impact. Because of this, in the event of a side impact, the initial movement of only one of the occupants 20 is toward the curtain airbag 14. The curtain airbag 14 can thereby help protect the occupant 20 that experiences the far side collision. Thereafter, the curtain airbag 14 can also protect the impact side occupant 20, who might rebound after initially impacting an outboard curtain airbag.

Figure 7:
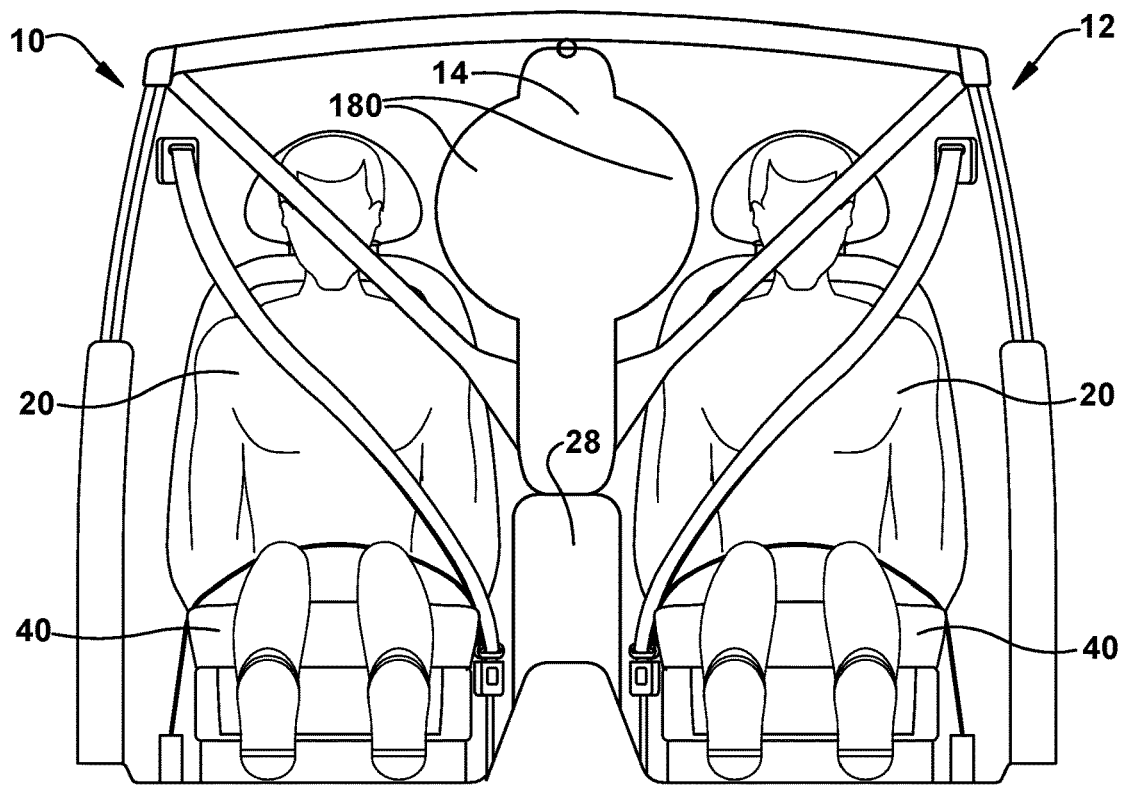
FIG. 7 is a schematic view illustrating a sixth example configuration of an apparatus for helping to protect a vehicle occupant.

As shown in FIG. 7, the configuration of FIG. 3 can be implemented in a curtain airbag 14 that includes head receiving portions 180 for occupants 20 of adjacent vehicle seats 30 and can therefore function in the manner described above with regard to FIG. 3 for both occupants, depending on which side of the vehicle 12 receives the impact.

Figure 8:
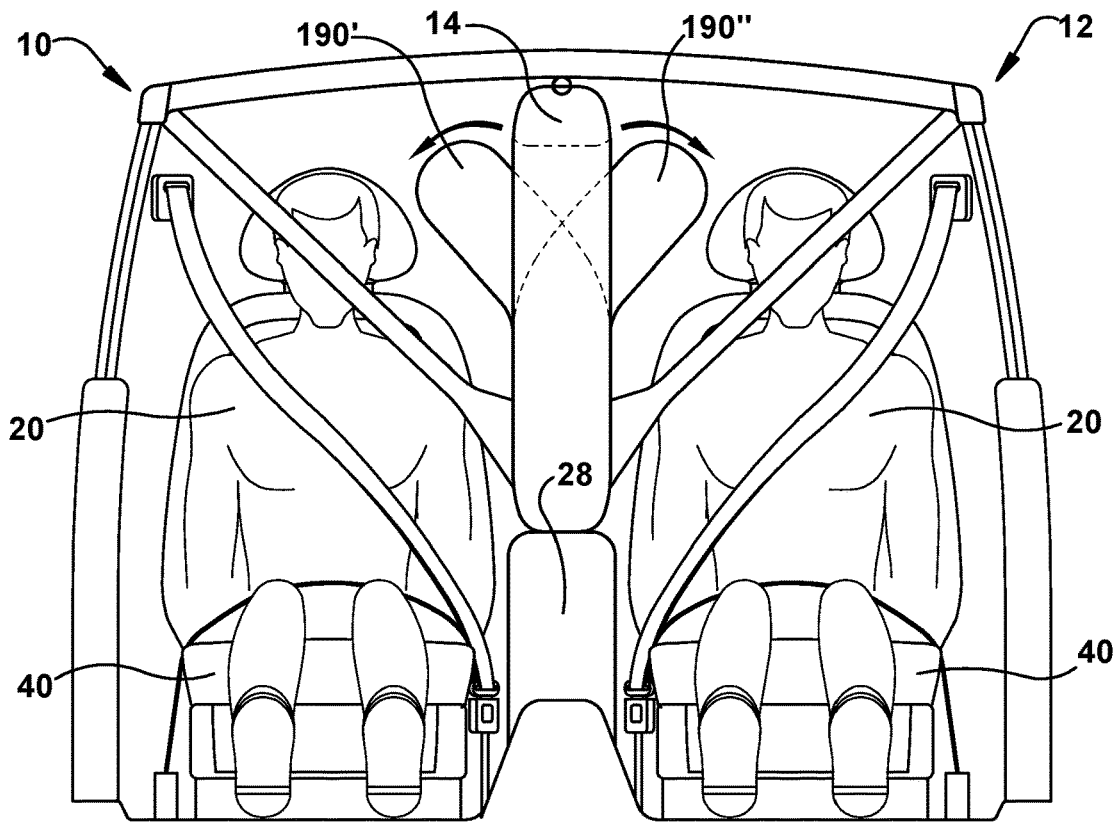
FIG. 8 is a schematic view illustrating a seventh example configuration of an apparatus for helping to protect a vehicle occupant.

As shown in FIG. 8, the configuration of FIG. 5 can be implemented in a curtain airbag 14 that includes a head receiving portion 190 that can respond to the occupant 20 moving into contact with the head receiving portion from the impact side of the vehicle. For example, if the impact side was the left side as viewed in FIG. 8, the head receiving portion would receive the occupant 20 on the right and, in response, move to the position illustrated generally at 190' in FIG. 8. If the impact side was the right side as viewed in FIG. 8, the head receiving portion would receive the occupant 20 on the right and, in response, move to the position illustrated generally at 190" in FIG. 8. The curtain airbag 14 can therefore function in the manner described above with regard to FIG. 5 for both occupants, depending on which side of the vehicle 12 receives the impact.

The curtain airbags 14 of FIGS. 6-8 implement structures similar or identical to those described above in regard to FIGS. 3-5, with the only difference being that they are configured for both driver side and passenger side occupants. Therefore, the balance between providing an effective ride-down and avoiding excessive rebound for the curtain airbag configurations of FIGS. 6-8 can be effectuated through tailoring that is similar or identical to those described above for the corresponding curtain airbag configurations of FIGS. 3-5.

Figure 9A:
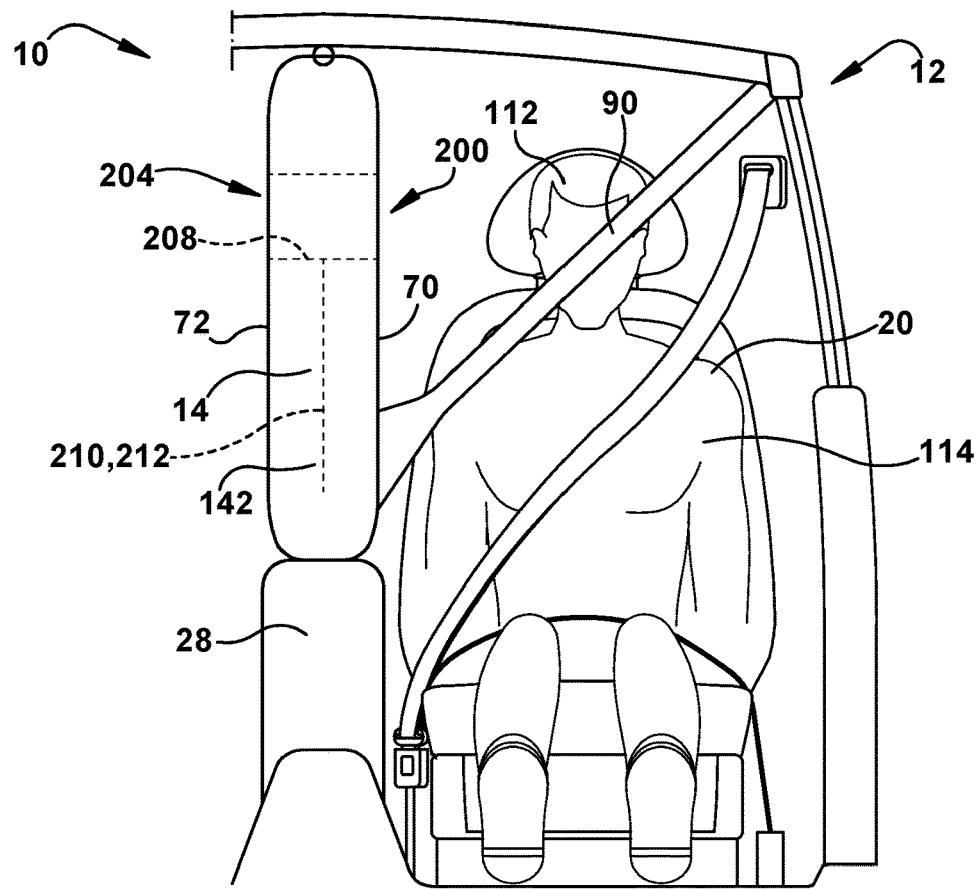
FIGS. 9A and 9B are schematic views illustrating a eighth example configuration of an apparatus for helping to protect a vehicle occupant.
Figure 9B:
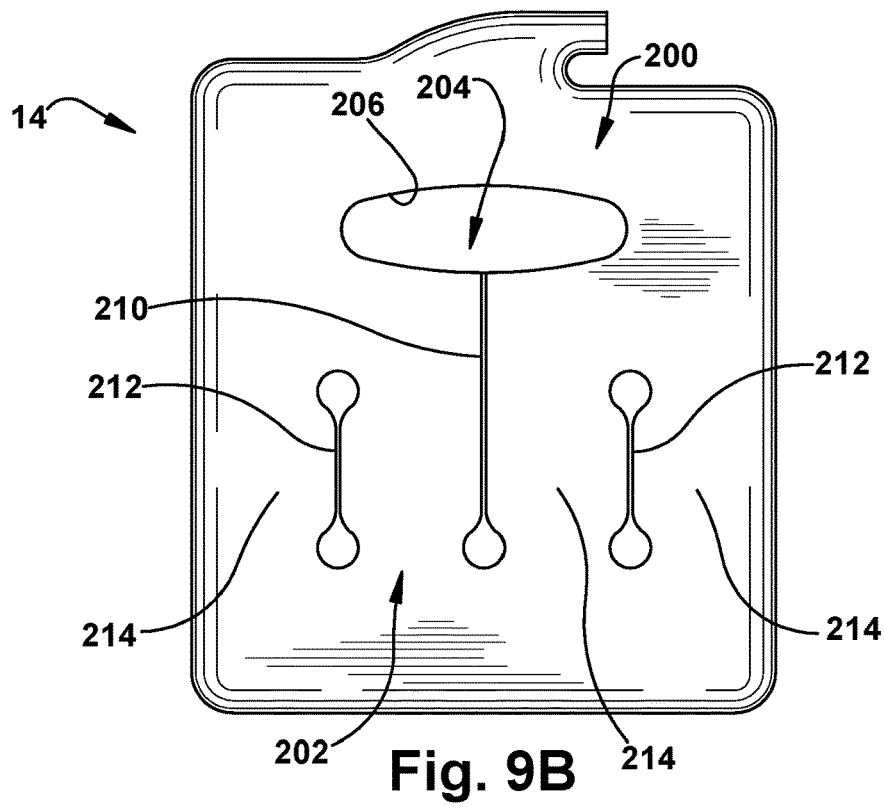

Another example configuration of the vehicle safety system 10 that implements an alternative configuration of the curtain airbag 14 is illustrated in FIGS. 9A and 9B. While the safety system 10 of FIGS. 9A and 9B illustrate one particular configuration of the tether 90, it should be appreciated that the safety system of FIGS. 9A and 9B can implement any of the configurational tether 90 variations described hereinabove with regard to FIGS. 1 and 2.

The curtain airbag 14 of FIGS. 9A and 9B can be similar or identical to the configuration described herein with regard to FIGS. 1 and 2, as well as the other embodiments disclosed herein, with the exception that the curtain airbag includes an upper, head receiving portion 200 positioned and a lower, torso receiving portion 202 that differs from those described in the previous configurations. The head receiving portion 200 includes an opening 204 that extends through the curtain airbag 14. The opening 204 is defined by a perimeter connection 206 that interconnects the airbag panels 70, 72.

The connection 206 is a generally elongated oblong or oval-like connection that defines the perimeter and the shape of the opening 204. In the example configuration of FIGS. 9A and 9B, the curtain airbag 14 includes additional connections 210 and 212 that help define the torso receiving portion 202. More specifically, a generally vertically extending connection 210 interconnects the panels 70, 72 centrally in the fore/aft direction of the curtain airbag 14. The connection 210 has an upper end portion that intersects the connection 206, and a lower end portion that terminates with a generally rounded, stress reducing portion. The connections 212 interconnect the panels 70, 72 and extend parallel to, and on opposite sides of, the connection 210. The connections 212 have opposite end portions that terminate with a generally rounded, stress reducing portion. The connections 210, 212 help define vertically extending parallel chambers 214 of the torso portion 202 of the curtain airbag 14.

The head receiving portion 200 is configured and arranged to receive the occupant's head 112 when moving in response to a far-side collision. Within the head receiving portion 200, the opening 204 is configured to receive the occupant's head 112, at least the upper portion of the occupant's head, so that the head can pass at least partially into and/or through the opening. At the same time, the occupant's torso 114 can impact the vertically extending chambers 214 of the torso portion 202. As a result, when the occupant 20 impacts the curtain airbag 14, the occupant's head 112, or at least a portion thereof, can move into the opening 204, while the remainder of the head and torso 114 can be cushioned by the head portion 200, including the inflatable portion thereof that surrounds the opening 204, and the torso portion 202.

Allowing the occupant's head 112, or a portion thereof, to enter the opening 204 can help reduce loading on the occupant's neck. To help achieve this, the curtain airbag 14 is configured so that the occupant's head 112 enters (at least partially) the opening 204 and the occupant's torso 114 engages the torso portion 202, which helps reduce neck bending that creates loads on the occupant's neck. Because the occupant 20 impacts the curtain airbag 14 in response to an opposite side collision, the torso 114 and head 112 move inboard toward the airbag, which results in neck bending toward the airbag. Allowing the head 112 to at least partially enter the opening 204 can help reduce the degree of rebound that occurs in response to impacting the curtain airbag 14. Because this rebounding results in the occupant head movement that bends the neck in the opposite direction, i.e., away from the curtain airbag 14, neck loading can be reduced.

It will therefore be appreciated that, in the particular circumstance of cushioning inboard occupant movement in response to a far side collision, the opening 204 in the curtain airbag 14 reduces head movement relative to the torso, which strikes a balance between ride-down and rebound, which reduces neck bending and loading. As with the previous configurations, the balance between providing an effective ride-down and avoiding excessive rebound can also be effectuated by tailoring the design and pressurization of the curtain airbag 14 and the chambers 214, as well as the configuration of the tethers 90, as discussed above.

Furthermore, the configurations of the opening 204 and the connections 210, 212, as well as the configurations of the resulting inflatable chambers of the curtain airbag 14, can vary. For example, the connection 206 can be varied to increase or decrease the size of the opening 204, change the shape of the opening, or to adjust its position on the curtain airbag. This can be done, for example, to account for or cover occupants of varying size. These adjustments to the size/shape/position that define the chambers 214 can, for example, be configured to cover occupant sizes based on statistical data regarding the human population, as is typical done with occupant safety system engineering. For instance, the size/shape/position of the curtain airbag 14, the connections 206, 210, 212, and the resulting opening 204 and chambers 214 can be configured to help cover occupants that fall within a size ranging from the small female 5% statistical occupant to the large male 95% statistical occupant. The system 10 can also be designed for other coverages within this range, or even outside this range.

From the above description of the invention, those skilled in the art will perceive improvements, changes and modifications. For example, while the example configurations of the vehicle safety systems herein have been described with regard to a single row of vehicle seats, the curtain airbag of any example configuration can be extended fore and aft in the vehicle between multiple rows of seats. The protections afforded by the various example configurations can thus be extended to the occupants of the multiple rows. Such improvements, changes and modifications within the skill of the art are intended to be covered by the appended claims.

Having described the invention, the following is claimed:

1. An apparatus for helping to protect an occupant of a vehicle seat of a vehicle in the event of a far-side collision in which the vehicle is impacted on a side opposite the vehicle seat, comprising:
a curtain airbag configured to inflate and deploy from a roof of the vehicle and being configured to protect the occupant of the vehicle seat, the curtain airbag having an inflated and deployed condition in which the curtain airbag is configured to be positioned inboard of the vehicle seat;
wherein the curtain airbag comprises a torso receiving portion configured to receive a torso of the occupant when the occupant moves into engagement with the curtain airbag in response to the far-side collision, and a head receiving portion configured to receive a head of the occupant when the occupant moves into engagement with the curtain airbag in response to the far-side collision, wherein the head receiving portion comprises an opening configured to receive at least a portion of the occupant's head when the occupant moves into engagement with the curtain airbag, the opening being configured so that the occupant's head can move into the opening without displacing any adjacent inflatable portions of the airbag, and the torso receiving portion comprises a plurality of vertically extending parallel chambers,
wherein the opening is defined by a perimeter connection between overlying panels of the curtain airbag that extends the perimeter of the opening, wherein the vertically extending parallel chambers are defined by vertically extending connections of the overlying panels of the curtain airbag, and wherein at least one of the vertically extending connections intersects the connection that defines the opening so that the vertically extending chambers configured to receive the torso extend up to and terminate at the head receiving opening;
wherein the apparatus further comprises at least one tether connected to a lower end portion of the curtain airbag and to an outboard portion of a vehicle structure in an area where the vehicle roof intersects a side structure of the vehicle, the outboard portion of the vehicle structure being on the same side of the vehicle as the vehicle seat.

2. The apparatus recited in claim 1, wherein a first end of the at least one tether is configured to be connected to the vehicle roof.

3. The apparatus recited in claim 2, wherein the first end of the at least one tether is configured to be connected to the vehicle roof at a location adjacent the side structure of the vehicle.

4. The apparatus recited in claim 2, wherein the first end of the at least one tether is configured to be connected to a roof rail of the vehicle.

5. The apparatus recited in claim 1, wherein a first end of the at least one tether is configured to be connected to the side structure of the vehicle.

6. The apparatus recited in claim 5, wherein the first end of the at least one tether is configured to be connected to a vehicle pillar.

7. The apparatus recited in claim 1, wherein the at least one tether comprises a first tether configured to be positioned forward of the vehicle occupant, and a second tether configured to be positioned rearward of the vehicle occupant.

8. The apparatus recited in claim 7, wherein the first and second tethers extend generally parallel to each other.

9. The apparatus recited in claim 7, wherein the first and second tethers extend generally inward at an angle from their connections to the vehicle to their connections to the curtain airbag.

10. The apparatus recited in claim 1, wherein the head receiving portion is configured to help reduce movement of the occupant's head relative to the occupant's torso in order to help limit neck bending and reduce neck loading.

11. The apparatus recited in claim 1, wherein the curtain airbag is configured to be positioned centrally in the vehicle when inflated and deployed.

12. The apparatus recited in claim 11, further comprising at least one second tether configured to connect the curtain airbag to a second outboard portion of vehicle structure in an area where the vehicle roof intersects a second side structure of the vehicle, the second outboard portion of the vehicle structure being on an opposite side of the vehicle as the vehicle seat, the curtain airbag being configured to help protect occupants seated on opposite sides of the curtain airbag.

13. An airbag module comprising the apparatus recited in claim 1 and an inflator configured to provide inflation fluid for inflating the curtain airbag.

14. A vehicle safety system comprising the airbag module recited in claim 13, at least one crash sensor, and an airbag control unit configured to detect the far-side collision in response to signals received from the at least one crash sensor, the airbag control unit being configured to actuate the inflator in response to detecting the far-side collision.

* * * * *